Oct. 21, 1947.  H. S. JONES  2,429,466
MEASURING AND CONTROLLING APPARATUS
Filed Nov. 4, 1942   2 Sheets-Sheet 1

FIG. I.

INVENTOR.
HARRY S. JONES.
BY
C B Spangenberg
ATTORNEY.

Oct. 21, 1947.    H. S. JONES    2,429,466
MEASURING AND CONTROLLING APPARATUS
Filed Nov. 4, 1942    2 Sheets-Sheet 2

*INVENTOR.*
HARRY S. JONES.
BY
C. B. Spangenberg
ATTORNEY.

Patented Oct. 21, 1947

2,429,466

UNITED STATES PATENT OFFICE 2,429,466

MEASURING AND CONTROLLING APPARATUS

Harry S. Jones, Washington, D. C., assignor to The Brown Instrument Company, Philadelphia, Pa., a corporation of Pennsylvania Application November 4, 1942, Serial No. 464,536

15 Claims. (Cl. 177—311)

1

My present invention relates to improved apparatus for measuring a variable condition and for selectively actuating devices accordingly as the condition measured changes in one direction or the other from a predetermined normal value. The devices thus actuated may comprise indicating provisions for visually exhibiting the character of the condition variation from normal, or may consist of or actuate adjusting means tending to restore the condition under measurement to its normal value on variations therefrom, or may consist of or actuate both indicating and adjusting means.

The present invention was primarily devised for use for controlling furnace conditions in installations in which the furnace temperature is measured by means of a thermoelectric element, such as a thermocouple, and an instrument responsive to the variations in electromotive force produced by the thermocouple. It will be understood, however, that the present invention is not limited to such use and also has especial utility in measuring the magnitude of electrical, chemical, physical and mechanical quantities and qualities such as electric current, hydrogen ion content, pressure or flow.

In one embodiment of my invention the instrument for measuring the thermocouple electromotive force has associated therewith a selective relay which is actuated in one way when the electromotive force of the thermocouple falls below a predetermined normal value and in a different way when the electromotive force rises above the normal value, and in a third way when the thermocouple electromotive force is the normal value. The selective relay is employed to operate furnace control elements which may comprise signalling devices from the actuation of which the furnace may be directly controlled as by the manipulation of manual control valves or switches or may comprise automatic temperature adjusting devices, or may comprise both signalling and automatic temperature adjusting devices.

A general object of the invention is to provide new and novel combinations and arrangements adapted to accomplish the results or purposes above specified.

Another object of the invention is to provide improved signalling and controlling apparatus of the type referred to above in which the instrument for measuring the electromotive force variations does not require the use of any physically movable parts deflecting in accordance with the variations in the condition.

Still another object of the invention is to provide improved signalling and controlling apparatus of the type referred to above in which a simplified circuit arrangement for producing the signalling operations is employed.

A more specific object of the invention is to provide an improved and simplified circuit arrangement for energizing signal lamps to produce a visual signal of the deviations in magnitude of a variable condition about a predetermined value.

Another specific object of the invention is to provide an improved and simplified arrangement which utilizes a cathode ray indicating tube for signalling the deviations in magnitude of a variable condition about a predetermined value.

A further specific object of the invention is to provide an improved instrument for measuring the magnitude and changes in magnitude of the thermocouple electromotive force in signalling and controlling apparatus of the type referred to above in which means are provided for eliminating extraneous fluctuating currents which may be induced in the thermocouple or in the leads extending between the instrument and the thermocouple.

A still further specific object of the invention is to provide an improved instrument for use in signalling and controlling apparatus which utilizes electronic valves and permits the use of cathode ray indicator tubes for producing the desired signals.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
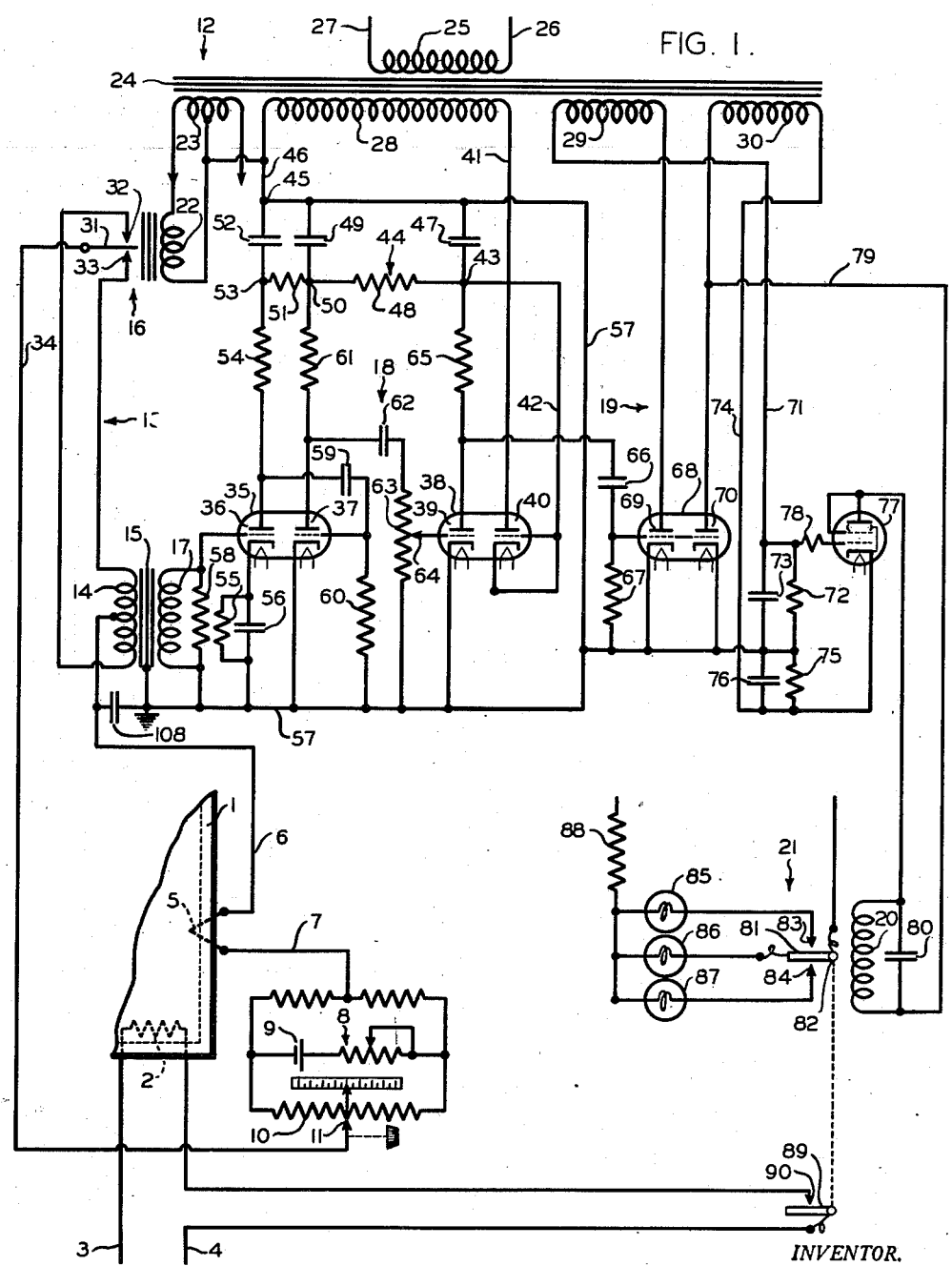
Fig. 1 is a diagrammatic representation of signalling and controlling apparatus embodying my invention.

In Fig. 1 of the drawings I have illustrated, more or less diagrammatically, a furnace or other compartment to be heated at 1 in which an electrical heating element 2 is arranged and adapted to be supplied with energizing current from electric current supply conductors 3 and 4. A thermocouple 5 which is sensitively responsive to variations in temperature is mounted in the furnace 1 and has its terminals connected by conductors 6 and 7 to the terminals of a deflectional potentiometric network 8 which may be located at a point remote from the furnace 1.

The potentiometric network 8 may be of any suitable type such as the Brown Potentiometer circuit disclosed in the Harrison Patent 1,898,124 issued February 21, 1933, and for the present purposes it is sufficient to note that the potentiometric circuit 8 includes a circuit branch comprising the thermocouple 5, an opposing circuit branch including a source of known potential, such as a battery 9, and a slide wire resistor 10 a variable portion of which may be connected in the opposed branches by means of a sliding contact 11 whereby the respective effects of the variable and known sources are made equal and opposite.

Differences in the variable and the known sources of electromotive force are adapted to be detected by an electronic device 12 which includes a converter 13 for transforming the unbalanced potentiometric direct currents into an alternating current which may be readily amplified. The converter 13 includes a center tapped primary winding 14 of a transformer 15 and an interrupter 16 which are connected in the conductor 6 leading to the thermocouple 5. The interrupter 16 operates to periodically interrupt the unbalanced current flow produced in the potentiometric circuit by the differential of the variable and known sources of potential to create a pulsating current flow in the transformer primary winding 14. This pulsating current flow is translated by the transformer 15 into an alternating current in the secondary winding 17 of transformer 15. The alternating current so derived in transformer secondary winding 17 is impressed on the input circuit of an amplifier 18, included in electronic device 12 wherein it is amplified and the amplified quantity is impressed on the input circuit of a reconverter 19, also included in electronic device 12, and which operates to reconvert the amplified alternating current to a unidirectional current. The unidirectional current so derived is impressed on the control winding 20 of a relay 21 to actuate the latter into its open, neutral or closed position.

The converter 13 illustrated schematically in the drawings operates to convert the potentiometric unbalanced direct currents into pulsating currents which are capable of being readily amplified. It will be understood that any suitable current interrupter may be employed for this purpose, and by way of example may be of the type shown and illustrated in application Serial Number 421,176 which was filed by Frederick W. Side on December 1, 1941, and issued into Patent 2,423,524 on July 8, 1947. The interrupter 16 is essentially a polarized switching mechanism and is provided with an operating winding 22 which is connected to and receives energizing current from the low voltage secondary winding 23 of a combination step-up and step-down transformer 24. The transformer 24 includes a line voltage primary winding 25 which is connected to and receives energizing current from alternating current supply conductors 26 and 27 which may desirably supply 60 cycle alternating current. Transformer 24 also includes high voltage secondary windings 28, 29 and 30 in addition to the low voltage secondary winding 23.

The interrupter 16 also includes a vibrating reed 31 and a pair of relatively stationary contacts 32 and 33 in addition to the operating winding 22. The operating winding 22 is arranged in cooperative relation with the reed 31 to vibrate the latter in synchronism with the alternating current supplied the winding 22 from the transformer secondary winding 23. Contact 32 is connected to one end terminal of the transformer primary winding 14 and the other end terminal of the latter is connected to the contact 33. The center tap on transformer primary winding 14 is connected to the conductor 6 and the reed 31 of the interrupter 16 is connected by a conductor 34 to the contact 11 in engagement with the potentiometer slide wire resistance 10. When the vibrating reed 31 is in engagement with the contact 32 the lower half of the primary winding 14 is connected in circuit with the opposed potentiometric potentials and when the reed 31 is in engagement with the contact 33 the upper half of the primary winding 14 is connected in circuit with those opposed potentials.

For purposes of explanation it may be assumed that contact 32 of the interrupter 16 is engaged by the vibrating reed 31 during the even half cycles of the alternating current supplied the operating winding 22 and the second contact 33 is engaged by the vibrating reed 31 during the odd half cycles of that alternating current supply. When the reed 31 is in its mid-position both of the contacts 32 and 33 are engaged by the reed 31, and therefore, when the reed 31 is vibrated it is alternately in engagement with one or the other of the contacts 32 and 33.

When the potentiometric network 8 is balanced, no current flows in conductors 6 and 34 and consequently operation of the interrupter 16 is ineffective to cause the flow of current through the primary winding of the transformer 15. When the electromotive force produced by the thermocouple 5 increases to unbalance the potentiometric network 8 in one direction, however, unbalanced potentiometric direct currents flow through the conductors 6 and 34 in the direction from the interrupter 16 to the transformer primary winding 14, and when the electromotive force of the thermocouple 5 decreases, unbalanced potentiometric direct currents flow through the conductors 6 and 34 in the direction from the transformer primary winding 14 to the interrupter 16.

Thus, upon unbalance of the potentiometric network 8 in the direction to render the conductor 6 positive with respect to the conductor 34 unbalanced potentiometric direct currents, during the even half cycles of the alternating current supplied by the transformer secondary winding 23, will flow from the conductor 6 to the center-tap on the transformer primary winding 14 through the lower half of the primary winding 14 to the interrupter contact 32, and through reed 31 to the conductor 34. During the odd half cycles of the alternating current supply the potentiometric unbalanced current will flow from the conductor 6 through the upper half of the winding 14 to contact 33 and through reed 31 to conductor 34. The pulsating direct current flows through the transformer primary winding 14 first through the lower half and then through the upper half operate through the core structure of the transformer to induce an alternating voltage in the transformer secondary winding 17 of one phase or of opposite phase relatively to the phase of alternating current supplied by the transformer secondary winding 23.

Upon unbalance of the potentiometric network 8 in the opposite direction the conductor 34 will be rendered positive to the conductor 6, and consequently, during the even half cycles of the alternating current supply the potentiometric unbalanced currents will flow from the conductor 34 to the reed 31, the contact 32, the lower terminal of the transformer primary winding 14, and through the lower half of the winding 14 to the conductor 6. During the odd half cycles the unbalanced current will flow from conductor 34 to the reed 31, the contact 33, the upper terminal of the winding 14, and through the upper half of the winding 14 to the conductor 6. Again the unbalanced potentiometric currents flow first through the lower half and then through the upper half of the winding 14, but for this condition of potentiometric unbalance it will be noted that the pulsating direct currents through the opposite halves of the transformer primary winding 14 are in the opposite direction from what they were when it was unbalanced in the direction first considered. As a result these pulsating direct current flows operate through the core structure of the transformer 15 to induce an alternating voltage in the transformer secondary winding 17 which is of the opposite phase relatively to the voltage of the alternating current supplied by the transformer secondary winding 23.

Thus, when the potentiometric network 8 is unbalanced in one direction an alternating voltage of one phase relatively to the voltage supplied by transformer secondary winding 23, and therefore relative to the voltage supplied by the supply conductors 26 and 27, is produced in the transformer secondary winding 17, and when the potentiometric network is unbalanced in the opposite direction an alternating voltage of the opposite phase relative to the voltage of the supply conductors 26 and 27 is induced in the transformer secondary winding 17. When the potentiometric network is balanced no current flows through the primary winding 14 of the transformer 15 and under this condition the alternating voltage derived in the transformer secondary winding 17 is zero.

The alternating voltage so derived in the transformer secondary winding 17 is amplified by the electronic valve amplifier 18. The input stage of the amplifier 18 includes an electronic tube 35 which as shown is of the double triode type. One triode of the valve 35 has been designated by the reference numeral 36 and the other triode thereof has been designated by the reference numeral 37. Both triods 36 and 37 include anode, control electrode, cathode and heater filament elements which are all contained within one envelope. The filaments of the triodes are connected in parallel and receive energizing current from the low voltage secondary winding 23 of the transformer 24 through conductors which have not been shown in order to avoid complication of the drawing. The transformer secondary winding 23 is also connected by means of conductors not shown to the heater filaments of an electronic valve 38 also included in the amplifier 18. The valve 38 includes two heater type triodes designated by the reference characters 39 and 40 within the same envelope. Both of the triodes of valve 38 include anode, control electrode, cathode and heater filament elements.

The triode 40 of the valve 38 is utilized as a half wave rectifier to provide a source of unidirectional voltage to energize the output circuits of the triodes 36, 37 and 39. The control electrode and cathode of triode 40 are connected to each other and the anode circuit of triode 40 is energized by the transformer secondary winding 28 through a circuit which may be traced from the right end terminal of the winding 28 as seen in the drawing through conductor 41 to the anode of triode 40, the cathode thereof and through a conductor 42 to the positive terminal 43 of a filter generally designated by the reference character 44. The negative terminal 45 of the filter is connected by a conductor 46 to the left end terminal of the transformer secondary winding 28.

The filter 44 includes a condenser 47 which operates to smooth out the ripple in the output voltage of the filter between the points 43 and 45. The filter 44 also includes a resistance 48 and a condenser 49 which operate to smooth out the ripple between the filter points 50 and 45. Filter 44 also includes a resistance 51 and a condenser 52 for smoothing out the output voltage between the points 53 and 45. Thus, the filter comprises 3 stages. Such a three stage filter is provided because for satisfactory and efficient operation it is desirable for the anode voltage supplied to the triode 36 to be substantially free from ripple whereas it is not necessary to supply anode voltage so free from ripple to the output circuit of triode 37. In addition, it is not necessary to supply anode voltage as completely free from ripple to the triode 39 as it is to the triode 37.

The anode circuit of the triode 36 may be traced from the filter point 53 which comprises a positive terminal of the filter through a fixed resistance 54 to the anode of the triode 36, the anode to cathode resistance, and through a cathode biasing resistance 55 which is shunted by a condenser 56 to the negative filter point 45 through a conductor 57. The cathode biasing resistance 55 and the parallel connected condenser 56 are utilized for biasing the control electrode of triode 36 negatively with respect to the cathode. The input circuit of the triode 36 may be traced from the cathode through the parallel connected resistance 55 and condenser 56 through the transformer secondary winding 17 to the control electrode of the triode 36. A resistance 58 is provided in shunt to the transformer secondary winding 17 for tuning the latter. If desired, a condenser may be connected in shunt to the transformer secondary winding 17 for this purpose.

The output circuit of the triode 36 is resistance capacity coupled to the input circuit of triode 37 by means of a condenser 59 and a resistance 60. To this end the anode of the triode 36 is connected by the condenser 59 to the control electrode of the triode 37 and the control electrode of triode 37 is connected by the resistance 60 to the conductor 57 and thereby the cathode of triode 37. The anode circuit of triode 37 may be traced from the positive terminal 50 of the filter 44 through a fixed resistance 61 to the anode of triode 37, the cathode thereof and conductor 57 to the negative terminal 45 of the filter. The output circuit of the triode 37 is resistance capacity coupled by means of a condenser 62 and a resistance 63 to the input circuit of the triode 39. As shown, the control electrode of triode 39 is connected to a contact 64 which is adjustable along the length of resistance 63.

The resistances 60 and 63 which are connected in the input circuits of the triodes 37 and 39, respectively, operate to maintain the potentials of the control electrodes of triodes 37 and 39 at the same potentials as their associated cathodes.

Upon the induction of a voltage in the transformer secondary winding 17 the resistances 60 and 63 permit the flow of grid current between the control electrodes of the triodes 37 and 39 and their associated cathodes and thereby limit the extent the control electrodes of the triodes are permitted to go positive with respect to their associated cathodes. The contact 64 which is provided in adjustable engagement with the resistance 63 is employed for varying the proportion of signal from the output circuit of the triode 37 which is impressed on the input circuit of the triode 39 and thereby for varying the sensitivity of the electronic amplifier 18.

The anode circuit of the triode 39 may be traced from the positive terminal 43 of the filter 44 through a fixed resistance 65 to the anode of triode 39, the anode to cathode resistance, and through conductor 57 to the negative terminal 45 of the filter.

The output circuit of the triode 39 is resistance capacity coupled by means of a condenser 66 and a resistance 67 to the input circuit of an electronic valve 68. The electronic valve 68 includes two triodes 69 and 70 within the same envelope each of which have anode, control electrode, cathode and heater filament elements. One triode of valve 68 has been designated by reference numeral 69 and the other by the reference numeral 70. The heater filaments of triodes 69 and 70 may desirably be connected in parallel with the heater filaments of valves 35 and 38 to the transformer secondary winding 23.

The input circuit of valve 68 comprises the input circuits of the triodes 69 and 70 which are connected in parallel and are coupled to the output circuit of the triode 39. To this end the anode of the triode 39 is connected by condenser 66 to the parallel connected control electrodes of triodes 69 and 70, and the control electrodes are connected by resistance 67 to the cathodes of triodes 69 and 70.

Anode voltage is supplied the output circuits of the triodes 69 and 70 from the high voltage secondary windings 29 and 30, respectively, of the transformer 24. That is to say, the anode of the triode 69 is connected to the right end terminal of the transformer secondary winding 29 and the anode of the triode 70 is connected to the left end terminal of the transformer secondary winding 30. The left end terminal of the transformer secondary winding 29 is connected by a conductor 71, in which a resistance 72 shunted by a condenser 73 is inserted, to the cathode of triode 69 and the right end terminal of the transformer secondary winding 30 is connected by conductor 74, in which a resistance 75 shunted by a condenser 76 is inserted, to the cathode of triode 70. As shown, the cathodes of the triodes 69 and 70 are connected to each other and to the point of engagement of resistances 72 and 75.

Thus, the anode circuit of the triode 69 is completed through the resistance 72 and the flow of anode current through this resistance operates to render the lower end of the resistance 72 positive with respect to the upper end. The anode circuit of the triode 70, on the other hand, is completed through the resistance 75 and the flow of anode current through this resistance operates to render the upper end of resistance 75 positive with respect to the lower end. The transformer secondary windings 29 and 30 are so wound on the transformer 24 that the triodes 69 and 70 are arranged to be rendered conductive during alternate half cycles. Condensers 73 and 76 are provided to maintain the potential drops across resistances 72 and 75 during the half cycles that the associated triodes 70 and 69 are non-conductive.

The output circuits of the triodes 69 and 70 are coupled to the input circuit of an electronic valve 77. The valve 77 may be of the type known and sold commercially as beam-power amplifier valves and is provided with anode, screen, control electrode, cathode, heater filament, and beam forming electrodes, and is arranged to be supplied with anode voltage from the transformer secondary winding 30. The heater filament of vave 77 is connected by conductors, not shown, to the low voltage transformer secondary winding 23 in parallel with the heater filaments of valves 35, 38 and 68.

The input circuit of the valve 77 may be traced from the control electrode through a grid current limiting resistance 78 and through the resistances 72 and 75 to the cathode. It will be noted that the potential drop across the resistance 72 tends to drive the control electrode of the valve 77 negative with respect to the potential of its associated cathode and that the potential drop across resistance 75 tends to drive the control electrode positive with respect to the potential of its associated cathode. Accordingly, when the triodes 69 and 70 are equally conductive the potential of the control electrode of valve 77 will be the same as that of its cathode. When the triode 69 becomes more conductive than the triode 70, however, the control electrode of the valve 77 will be driven negative while it will tend to be driven positive when the triode 70 becomes more conductive than the triode 69.

The output circuit of the valve 77 may be traced from the left end terminal of the transformer secondary winding 30 to a conductor 79, in which the operating coil 20 of relay 21 is inserted, to the anode of valve 77 and from the cathode thereof to the conductor 74 to the right end terminal of the winding 30. A condenser 80 is provided in shunt to the operating coil of relay 21 for smoothing the ripple in the output current from the valve 77 which flows through the winding 20. This operates to prevent chattering of the relay.

The current flow in the output circuit of the valve 77 and thereby through the operating coil 20 of relay 21 is a predetermined value when the triodes 69 and 70 are equally conductive and is increased when a signal is impressed upon the input circuit of the triodes 69 and 70 of the proper phase to render the triode 70 more conductive than the triode 69. On the other hand the flow in the output circuit and through the coil is decreased when the signal impressed on the input circuit of the triodes 69 and 70 is of the proper phase to render the triode 69 more conductive than the triode 70.

The relay 21 includes an armature 81 which is pivoted for rotation at a point 82 and is arranged in cooperative relation with a pair of relatively stationary contacts 83 and 84. The armature 81 is biased by gravity or suitable spring means for rotation in a counterclockwise direction about its pivot point 82 and is actuated by the operating coil 20 of relay 21 for rotation in a clockwise direction. When the potentiometric network 8 is precisely balanced the current flow through the operating coil 20 is the proper value to actuate the armature 81 to a position in which it is out of engagement with both the contacts 83 and 84. When the potentiometric network 8 is unbalanced in the direction to increase the conductivity of the triode 70 relative to that of the triode 69 and thereby to increase the current in the operating coil 20, the armature 81 is actuated into engagement with the contact 83. When the potentiometric network 8 is unbalanced in the opposite direction the current flow through the operating coil 20 is decreased and the armature 81 is then actuated by gravity or its associated spring means into engagement with the contact 84. Thus, if the temperature of the furnace 1 rises above or falls below the predetermined value the apparatus is designed to maintain the temperature and the armature 81 is actuated into engagement with one or the other of its associated contacts 83 and 84 to produce the desired control operation.

In accordance with the present invention the deflections of the armature 81 into engagement with the contacts 83 and 84 from the position in which it does not engage either contact are utilized to simultaneously selectively energize one of a plurality of electric lamps 85, 86 and 87 to provide a visual indication or signal of the temperature condition within the furnace 1. To this end the armature 81 is connected by a conductor to one terminal of a source of alternating current which may comprise a secondary winding provided on the transformer 24 but has not been shown in order to avoid complication of the drawing, and the other terminal of that alternating current source is connected by a conductor, in which a resistance 88 is inserted, to a common terminal of the lamps 85, 86 and 87. The other terminal of the lamp 85 is connected to contact 83 of relay 21 and the other terminal of lamp 86 is connected to armature 81. The other terminal of lamp 87 is connected to the contact 84 of relay 21. By way of illustration it is noted that when the voltage of the alternating current source which is utilized for energizing lamps 85, 86 and 87 is 6.3 volts, the resistance 88 may have a value of 7.5 ohms and the lamps 85 and 87 may be 2.5 volt lamps and the lamp 86 may be a 6.3 volt lamp.

When the relay armature 81 is intermediate and out of engagement with both of the contacts 83 and 84 only the lamp 86 will be connected in circuit through the resistance 88 to the terminals of the alternating current supply source. Since the lamp 86 is a 6.3 volt lamp and the voltage of the alternating current source is 6.3 volts, the lamp 86 will then be illuminated to visually indicate that the potentiometric network 8 is precisely balanced and that the temperature within the furnace 1 is at the desired, normal value.

Upon a change in the furnace temperature, for example, upon an increase in temperature the potentiometric network 8 will be unbalanced in the direction to effect an increase in the conductivity of triode 69 relative to that of triode 70 and thereby to effect a decrease in the current through the operating coil 20 of the relay 21. The armature 81 will then be actuated into engagement with the contact 84 and thus operate to connect the lamp 87 in shunt to the lamp 86 across the terminals of the alternating current supply source. The connection of lamp 87 in parallel to the lamp 86 will operate to effectively deenergize the lamp 86 for illumination because the filament of lamp 87 is of lower resistance and is designed to be illuminated with only 2.5 volts impressed thereon. Thus, the connection of lamp 87 in parallel with lamp 86 operates to reduce the voltage impressed across both of the lamps to a point below the voltage at which the lamp 86 is illuminated. The voltage impressed on the lamps 86 and 87, is not reduced below the point at which the lamp 87 is illuminated, however. The illumination of lamp 87 provides a visual indication of the increase in temperature within the furnace 1.

Upon a decrease in the furnace temperature the potentiometric network 8 is unbalanced in the opposite direction to effect an increase in the current flow through the operating coil of relay 21 and thereby actuation of the relay armature 81 into engagement with contact 83. The lamp 85 is then connected in parallel with the lamp 86 and because of the reduced voltage impressed on the lamp 86, the latter is effectively deenergized for illumination but the voltage impressed on the lamps is high enough to illuminate the lamp 85. Consequently, the lamp 85 is then illuminated and provides a visual indication or signal that the temperature within the furnace 1 is below the control point.

The relay 21 is also provided with a second armature 89 which is biased by gravity or by suitable spring means (not shown) in a counterclockwise direction and is adapted to be rotated in a clockwise direction into engagement with a contact 90 upon energization of the operating coil 20 of the relay. The armature 89 and contact 90 are connected in the energizing circuit to the furnace heating resistance 2 from the electric current supply conductors 3 and 4. The armature 89 is so arranged with respect to the contact 90 that when the temperature within the furnace 1 is at the desired value and the potentiometric network 8 is precisely balanced the armature 89 is maintained out of engagement with the contact 90. Upon slight decrease of the temperature within the furnace 1 from the desired value the potentiometric network 8 is unbalanced in the proper direction to effect an increase in the energizing current flow through the operating coil of relay 21 to effect actuation of the armature 89 into engagement with the contact 90 and thereby to close the energizing circuit to the furnace heating resistance 2 from the electric current supply conductors 3 and 4. Upon increase in the temperature within the furnace 1 from the desired value the potentiometric network 8 is unbalanced in the opposite direction to effect a decrease in the energizing current flow through the operating coil 20 of relay 21 and thereby actuation of the contact 89 away from the contact 90.

The temperature value which the control apparatus described operates to maintain within the furnace 1 may be adjusted by varying the position of contact 11 along the length of the slidewire resistance 10. To facilitate such adjustment a scale calibrated in terms of temperature may be arranged in cooperative relation with the contact 11 and the contact 11 may be adjusted by manipulation of a knob, as shown.

Figure 2:
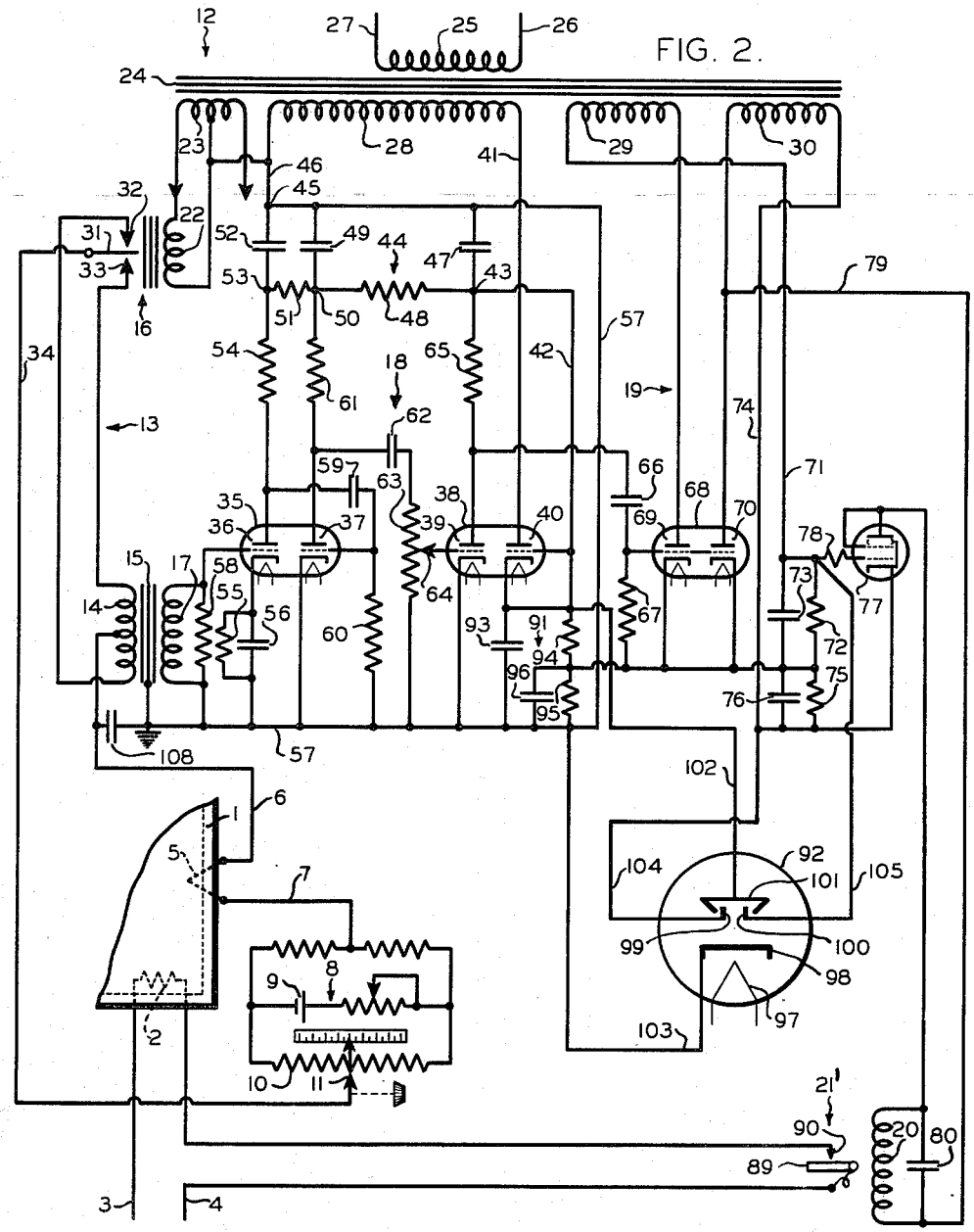
Fig. 2 illustrates a modification of Fig. 1.

In Fig. 2 I have illustrated more or less diagrammatically a modification of the arrangement of Fig. 1 in which a cathode ray tube is employed in lieu of the plurality of electric lamps for visually signalling the deviations from normal in the furnace temperature condition. In this modified arrangement the energization of the furnace heating resistance 2 is controlled by means of a relay 21' which includes an operating coil 20 connected in the output circuit of the electronic tube 77 and is also provided with an armature 89 and a contact 90 associated with the armature.

The potentiometric measuring circuit 8 and the converter 13 of Fig. 2 are identical to the correspondingly identified parts of Fig. 1. The amplifier 18 differs from the amplifier 18 of Fig. 1 only in that an additional filtering section 91, the input terminals of which are connected to the rectifier section 40 of valve 38, is provided for supplying unidirectional voltage for energizing the target of the cathode ray tube indicator which has been designated by the reference numeral 92. The filter 91 includes a condenser 93 which is connected between the cathode of rectifier 40 and the ground conductor 57 and also includes a pair of resistances 94 and 95 which are connected in shunt to the condenser 93. A condenser 96 is also provided in shunt to the resistance 95.

The cathode ray tube 92 is of the type known as electron-ray indicator tubes and may be of the type known and sold commercially as the RCA type 6AF6-G. This tube is provided with a heater filament 97, a cathode 98, a pair of ray-control electrodes 99 and 100 and a target 101. The target 101 in the type 6AF6-G tube is in the shape of a right circular cone having its apex or point adjacent the cathode 98 and the ray control electrodes 99 and 100 extended through the opening in the cone so provided. The cathode 98 is cylindrical in form and the ray control electrodes 99 and 100 are positioned diametrically opposite each other between the cathode 98 and the target 101. Electrons flowing from the cathode 98 to the cone shaped target 101 produce a brilliant coloring on the target having a greenish hue. When the ray control electrodes are at the same potential as the cathode 98 a shadow conforming to the physical dimensions of the ray control electrodes will be symmetrically produced on diametrically opposite sides on the target 101. This shadow is produced because of the action of the ray control electrodes in acting as physical barriers obstructing the flow of electrons from the cathode to the target 101.

When one or the other of the ray control electrodes 99 and 100 is rendered negative with respect to the potential of the cathode 98, the ray control electrode so rendered negative operates to effect a dispersal of the electrons flowing from the cathode 98 to the target 101 to thereby produce widening of the shadow cast on the corresponding side of the target 101.

The heater filament 97 is connected by conductors, not shown, to the transformer secondary winding 23 and receives energizing current therefrom. If desired, a separate secondary winding may be provided on the transformer 24 for energizing the heater filament 97. Target 101 is connected by a conductor 102 to the positive output terminal of the filter 91 while the cathode 98 is connected by a conductor 103 to the negative output terminal of the filter 91. The ray-control electrode 99 is connected by a conductor 104 to the lower end of resistance 75 as seen in the drawing and the ray-control electrode 100 is connected by a conductor 105 to the upper terminal of the resistance 72.

Figure 3:
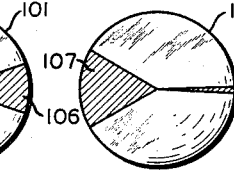

When both of the triodes 69 and 70 of electronic valve 68 are equally conductive, the condition as noted hereinbefore as existing when the potentiometric network 8 is precisely balanced, the potential drop across resistance 72 is exactly the same as that across resistance 75, and consequently, the ray-control electrodes 99 and 100 will be at the same potential relatively to the potential of the cathode 98. Under this condition, the shadow cast on the target 101 by the ray-control electrode 99 will be exactly the same size as that cast on the target by the ray-control electrol 100. This condition has been illustrated in Fig. 3 wherein the shadows on diametrically opposite halves of the target 101 have been indicated by the reference numerals 106 and 107, respectively.

Figure 4:
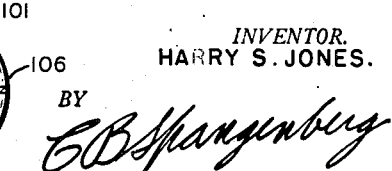

Upon unbalance of the potentiometric network 8 as a result of a decrease in furnace temperature, for example, the triode 70 of electronic valve 68 will be rendered more conductive than the triode 69 to thereby effect an increase in the potential drop across the resistance 75 and a decrease in the potential drop across the resistance 72. As a result the ray-control electrode 99 will be rendered more negative with respect to the potential of cathode 98 and the ray-control electrode 100 will be rendered less negative with respect to the potential of the cathode. Consequently, the shadow cast by the ray-control electrode 99 will be widened whereas that cast by the ray-control electrode 100 will be narrowed. The appearance of the target 101 under this condition of operation has been illustrated in Fig. 4 wherein the area designated 107 illustrates the widened shadow and the area 106 the narrowed shadow.

Figure 5:
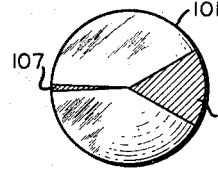
Figs. 3, 4 and 5 illustrate the visual indications produced by a cathode ray signalling tube provided in the arrangement of Fig. 2 upon variations in the condition measured about a predetermined value.

Upon an increase in the furnace temperature and consequently unbalance of the potentiometric network 8 in the opposite direction the triode 69 of electronic valve 68 will be rendered more conductive than the triode 70 to effect an increase in the potential drop across resistance 72 and a decrease in the potential drop across resistance 75. This will cause the ray-control electrode 100 to be rendered more negative with respect to the potential of the cathode 98 and the ray-control electrode 99 to be rendered less negative with respect to the potenial of the cathode. Under this condition the shadow cast by the ray-control electrode 100 will be widened whereas that cast by the ray-control electrode 99 will be narrowed. The appearance of the target 101 for this condition of operation is illustrated in Fig. 5.

Thus, the electron-ray indicator tube 92 operates to visually indicate or exhibit the character of the variation in temperature within the furnace 1 from normal, and also operates to provide an indication that the furnace temperature is at the normal value.

In order to eliminate the effects of undesired stray alternating or fluctuating currents which may be extraneously induced into the potentiometric network 8 or in the thermocouple 5 or in its conducting leads 6 and 7, a condenser 108 is provided between the center-tap on the transformer primary winding 14 and the cathode conductor 57. As shown, the core structure of the transformer 15 is also connected to the ground conductor 57. I have discovered that by providing condenser 108 connected as shown, any stray alternating or fluctuating currents which may be induced in the thermocouple leads are by-passed to ground and their effect on the operation of the measuring and control apparatus is thus materially reduced if not altogether eliminated.

Subject matter relating to the arrangement for energizing signal lamps to provide visual indication of variations in magnitude of a variable condition disclosed but not specifically claimed herein is disclosed and claimed in divisional application Serial Number 640,285, filed January 10, 1946.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. Apparatus to indicate the deviations in magnitude of a unidirectional potential from a predetermined value including a unidirectional potential of known magnitude, a circuit to oppose said potentials to derive a differential unidirectional potential, means including intermittently operating circuit interrupting means connected in said circuit to convert the differential unidirectional potential into a fluctuating potential of one phase or of opposite phase depending upon the polarity of said differential potential, electronic means to amplify said fluctuating potential, electronic means to reconvert the amplified fluctuating potential into a unidirectional potential of one polarity or of the opposite polarity depending upon the phase of said fluctuating potential, said electronic reconversion means including a pair of triodes having input circuits which are connected in parallel and each having output circuits, means to impress the amplified fluctuating potential on the input circuits of said triodes, a resistance connected in the output circuit of each triode, one terminal of each resistance being connected to a common point in the output circuits of said triodes, and a separate source of alternating voltage for energizing the output circuit of each triode, the alternating current from one source being displaced approximately 180° from that of the other source whereby said triodes are adapted to be alternately rendered conductive, and means responsive to differences in the potential drops produced across said resistances by the current flow in the output circuits of said triodes for indicating the deviations in magnitude of said first mentioned unidirectional potential.

2. The combination of claim 1 wherein said last mentioned means include a cathode ray tube having a pair of control electrodes on one of which the potential drop across one of said resistances is applied and on the other of which the potential drop across the other of said resistances is applied.

3. The combination of a device responsive to the variations in magnitude of a variable condition and arranged to produce a unidirectional potential which varies in magnitude in correspondence with the variations in said variable condition, of a meter, said meter including a unidirectional potential of known magnitude, a circuit to oppose said potentials to derive a differential unidirectional potential, means including intermittently operating circuit interrupting means connected in said circuit to convert the differential unidirectional potential into a fluctuating potential of one phase or of opposite phase depending upon the polarity of said differential potential, electronic means to amplify said fluctuating potential, electronic means to reconvert the amplified fluctuating potential into a unidirectional potential of one polarity or of the opposite polarity depending upon the phase of said fluctuating potential, said electronic reconversion means including a pair of triodes having input circuits which are connected in parallel and each having output circuits, means to impress the amplified fluctuating potential on the input circuits of said triodes, a resistance connected in the output circuit of each triode, one terminal of each resistance being connected to a common point in the output circuits of said triodes, and a separate source of alternating voltage for energizing the output circuit of each triode, the alternating current from one source being displaced approximately 180° from that of the other source whereby said triodes are adapted to be alternately rendered conductive, and means responsive to differences in the potential drops produced across said resistances by the current flow in the output circuits of said triodes for regulating the magnitude of said variable condition.

4. The combination of claim 3 wherein said last mentioned means includes a relay having an operating coil and an electronic valve having an input circuit on which the differential in the potential drops across said resistances is applied and an output circuit including the operating coil of said relay.

5. The combination of a device responsive to the variations in magnitude of a variable condition and arranged to produce a unidirectional potential which varies in magnitude in correspondence with the variations in said variable condition, of a meter for measuring said unidirectional potential, said meter including a unidirectional potential of known magnitude, a circuit to oppose said potentials to derive a differential unidirectional potential, means including intermittently operating circuit interrupting means connected in said circuit to convert the differential unidirectional potential into a fluctuating potential of one phase or of opposite phase depending upon the polarity of said differential potential, electronic means to amplify said fluctuating potential, electronic means to reconvert the amplified fluctuating potential into a unidirectional potential of one polarity or of the opposite polarity depending upon the phase of said fluctuating potential, said electronic reconversion means including a pair of triodes having input circuits which are connected in parallel and each having output circuits, means to impress the amplified fluctuating potential on the input circuits of said triodes, a resistance connected in the output circuit of each triode, one terminal of each resistance being connected to a common point in the output circuits of said triodes, and a separate source of alternating voltage for energizing the output circuit of each triode, the alternating current from one source being displaced approximately 180° from that of the other source whereby said triodes are adapted to be alternately rendered conductive, and electric signalling means responsive to differences in the potential drops produced across said resistances by the current flow in the output circuits of said triodes for signalling the character of the variations in said variable condition.

6. The combination of a device responsive to the variations in magnitude of a variable condition and arranged to produce a unidirectional potential which varies in magnitude in correspondence with the variations in said variable condition, of a meter for measuring said unidirectional potential said meter including a unidirectional potential of known magnitude and means to oppose said potentials to derive a differential potential, means for signalling the character of the variations in said variable condition including a cathode ray tube, and means including electronic amplifying means directly and electrically controlled by said differential potential to control said cathode ray tube.

7. The combination with a furnace of a thermoelectric device and a meter for measuring the temperature of the furnace, said meter including a unidirectional potential of known magnitude, means to oppose said known potential to the unidirectional potential produced by said thermoelectric device to derive a differential potential, and means including electronic means for amplifying said differential potential, of a cathode-ray tube controlled by said electronic means for signalling the character of the temperature variations of said furnace.

8. The combination of a device responsive to the variations in magnitude of a variable condition and arranged to produce a unidirectional potential which varies in magnitude in correspondence with the variations in said variable condition, of a meter for measuring said unidirectional potential, said meter including a unidirectional potential of known magnitude, a circuit to oppose said potentials to derive a differential unidirectional potential, means including intermittently operating circuit interrupting means connected in said circuit to convert the differential unidirectional potential into a fluctuating potential of one phase or of opposite phase depending upon the polarity of said differential potential, electronic means to amplify said fluctuating potential, electronic means to reconvert the amplified fluctuating potential into a unidirectional potential of one polarity or of the opposite polarity depending upon the phase of said fluctuating potential, said electronic reconversion means including a pair of triodes having input circuits which are connected in parallel and each having output circuits, means to impress the amplified fluctuating potential on the input circuits of said triodes, a resistance connected in the output circuit of each triode, one terminal of each resistance being connected to a common point in the output circuits of said triodes, and a separate source of alternating voltage for energizing the output circuit of each triode, the alternating current from one source being displaced approximately 180° from that of the other source whereby said triodes are adapted to be alternately rendered conductive to produce a potential drop across each of said resistances, an electron-ray tube to signal the character of the variations in said variable condition, said electron-ray tube having a target, a cathode and a pair of control electrodes, means for impressing an energizing voltage between said target and cathode, and means for impressing the potential drop across one of said resistances between the cathode and one of said control electrodes and for impressing the potential drop across the other of said resistances between the cathode and the other of said electrodes.

9. Apparatus to indicate the deviations in magnitude of a unidirectional potential from a predetermined value including a unidirectional potential of known magnitude, a circuit to oppose said potentials to derive a differential unidirectional potential, means including intermittently operating circuit interrupting means connected in said circuit to convert the differential unidirectional potential into a fluctuating potential of one phase or of opposite phase depending upon the polarity of said differential potential, electronic means to amplify said fluctuating potential, electronic means to reconvert the amplified fluctuating potential into a unidirectional potential of one polarity or of the opposite polarity depending upon the phase of said fluctuating potential, said electronic reconversion means including a pair of triodes having input circuits which are connected in parallel and each having output circuits, means to impress the amplified fluctuating potential on the input circuits of said triodes, a resistance connected in the output circuit of each triode, one terminal of each resistance being connected to a common point in the output circuits of said triodes, and a separate source of alternating voltage for energizing the output circuit of each triode, the alternating current from one source being displaced approximately 180° from that of the other source whereby said triodes are adapted to be alternately rendered conductive to produce a potential drop across each of said resistances, an electron-ray tube to indicate the deviations in magnitude of said first mentioned unidirectional potential, said electron-ray tube having a target, a cathode, and a pair of control electrodes, means for impressing an energizing voltage between said target and cathode, and means for impressing the potential drop across one of said resistances between the cathode and one of said control electrodes and for impressing the potential drop across the other of said resistances between the cathode and the other of said electrodes.

10. Apparatus to indicate the existence and also the phase of a fluctuating potential including a pair of electronic valves having input circuits which are connected in parallel and each having output circuits, a circuit including the input circuits of said valves and the source of said fluctuating potential, a resistance connected in the output circuit of each valve, one terminal of each resistance being connected to a common point in the output circuits of said valves, and a separate source of alternating voltage for energizing the output circuit of each valve, the alternating current from one source being displaced approximately 180° from that of the other source whereby said valves are adapted to be alternately rendered conductive, and means responsive to differences in the potential drops produced across said resistances by the current flow in the output circuits of said valves for indicating the existence and the phase of said fluctuating potential.

11. Apparatus to indicate the existence and also the phase of a fluctuating potential including a pair of electronic valves having input circuits which are connected in parallel and each having output circuits, a circuit including the input circuits of said valves and the source of said fluctuating potential, a resistance connected in the output circuit of each valve, one terminal of each resistance being connected to a common point in the output circuits of said valves, and a separate source of alternating voltage for energizing the output circuit of each valve, the alternating current from one source being displaced approximately 180° from that of the other source whereby said valves are adapted to be alternately rendered conductive, and a cathode ray tube responsive to differences in the potential drops produced across said resistances by the current flow in the output circuits of said valves for indicating the existence and the phase of said fluctuating potential.

12. Apparatus to indicate the existence and also the phase of a fluctuating potential including a pair of electronic valves having input circuits which are connected in parallel and each having output circuits, a circuit including the input circuits of said valves and the source of said fluctuating potential, a resistance connected in the output circuit of each valve, one terminal of each resistance being connected to a common point in the output circuits of said valves, and a separate source of alternating voltage for energizing the output circuit of each valve, the alternating current from one source being displaced approximately 180° from that of the other source whereby said valves are adapted to be alternately rendered conductive to produce a potential drop across each of said resistances, an electron-ray tube to indicate the existence and the phase of said fluctuating potential, said electron-ray tube having a target, a cathode and a pair of control electrodes, means for impressing an energizing voltage between said target and cathode, and means for impressing the potential drop across one of said resistances between the cathode and one of said control electrodes and for impressing the potential drop across the other of said resistances between the cathode and the other of said electrodes.

13. A system for visually indicating the phase relation between two alternating voltages of the same frequency and/or the magnitude of one of them which comprises a cathode-ray tube having at least one means for deflecting the cathode-ray, a rectifier system including a controlled rectifier, means for impressing said voltages upon the grid and anode circuits respectively of said rectifier system, and means for energizing said deflection means in accordance with the resulting unidirectional current in the anode circuit of said rectifier system.

14. A system for visually indicating the phase relation between two alternating voltages of the same frequency and/or the magnitude of one of them which comprises a cathode-ray tube having at least one means for deflecting the cathode-ray, a rectifier system including at least one pair of grid-controlled rectifiers, means for applying one of said voltages to effect in-phase variations of the grid potentials of a pair of said rectifiers, means for applying the other of said voltages to effect out-of-phase variations of the potentials of the rectifier anodes associated with said grids, and means for exciting said deflection means in a sense and to an extent dependent upon the resulting anode currents of said rectifiers.

15. A system for visually indicating the phase relation between two alternating voltages of the same frequency and/or the magnitude of one of them which comprises a cathode-ray tube having at least one pair of deflection plates, a rectifier system including a grid-controlled rectifier, means for impressing one of said alternating voltages upon the grid circuit of said rectifier system, means for impressing the other of said alternating voltages upon the anode circuit of said rectifier system, and means for deriving from the resulting unidirectional current in the anode circuit of said rectifier system a voltage applied to said pair of deflection plates.

HARRY S. JONES.

REFERENCES CITED

The following references are of record in the file of this patent:

UNITED STATES PATENTS

| Number | Name | Date |
| --- | --- | --- |
| 1,443,166 | Brown | Jan. 23, 1923 |
| 1,967,887 | Johnston | July 24, 1934 |
| 2,301,635 | Norton | Nov. 10, 1942 |
| 1,909,712 | Oppegaard | May 16, 1933 |
| 2,113,164 | Williams | Apr. 5, 1938 |
| 2,203,689 | Macdonald | June 11, 1940 |
| 2,300,742 | Harrison et al. | Nov. 3, 1942 |
| 2,301,635 | Norton | Nov. 10, 1942 |
| 1,443,165 | Brown | Jan. 23, 1923 |

FOREIGN PATENTS

| Number | Country | Date |
| --- | --- | --- |
| 473,011 | France | June 3, 1914 |